United States Patent [19]

Bertling et al.

[11] Patent Number: 5,056,713
[45] Date of Patent: Oct. 15, 1991

[54] HEATING SYSTEM FOR THE PASSENGER COMPARTMENT OF A MOTOR VEHICLE HAVING A LIQUID-COOLED INTERNAL COMBUSTION ENGINE

[75] Inventors: Johannes-Gerhard Bertling, Vaihingen/Enz; Jürgen Hess, Baden-Baden; Gerd Lentz, Bühl-Oberweier; Christoph Heier, Iffezheim, all of Fed. Rep. of Germany

[73] Assignee: Robert Bosch GmbH, Stuttgart, Fed. Rep. of Germany

[21] Appl. No.: 477,989

[22] PCT Filed: Aug. 23, 1989

[86] PCT No.: PCT/DE89/00547
§ 371 Date: Apr. 20, 1990
§ 102(e) Date: Apr. 20, 1990

[87] PCT Pub. No.: WO90/03285
PCT Pub. Date: Apr. 5, 1990

[30] Foreign Application Priority Data
Sep. 21, 1988 [DE] Fed. Rep. of Germany ....... 3831959

[51] Int. Cl.⁵ ............................................ G05D 23/00
[52] U.S. Cl. .............................. 237/2 A; 237/12.3 A; 237/12.3 B; 137/625.66
[58] Field of Search .................... 137/625.66, DIG. 8; 237/2 A, 12.3 A, 12.3 B, 12.3 R, 8 C, 8 R

[56] References Cited

U.S. PATENT DOCUMENTS
4,416,307 11/1983 Detweiler ...................... 137/625.66

FOREIGN PATENT DOCUMENTS
590737 6/1925 France ........................... 237/12.3 B Primary Examiner—Henry Bennett
Attorney, Agent, or Firm—Michael J. Striker

[57] ABSTRACT

A heating system for a passenger compartment of a motor vehicle includes a heat exchanger located in the passenger compartment and a feeding conduit extending between the heat exchanger and the cooling circuit of the vehicle internal combustion engine and connected to the cooling circuit at a point downstream of the internal combustion engine in a direction of liquid flow. A return conduit extends between the heat exchanger and a delivery unit of the cooling circuit. The heating system also includes a shut-off device for blocking flow of heat to the heat exchanger. The shut-off device has first and second chambers and inlet and outlet ports communicating with the first chamber. A pressure port communicates with the second chamber and is connected with the feeding conduit. A wall separates the first and second chambers. The wall is movable between a first position in which it blocks communication between the inlet port and the outlet port, and a second position in which it closes the pressure port and provides for communication between the inlet and outlet ports.

8 Claims, 1 Drawing Sheet

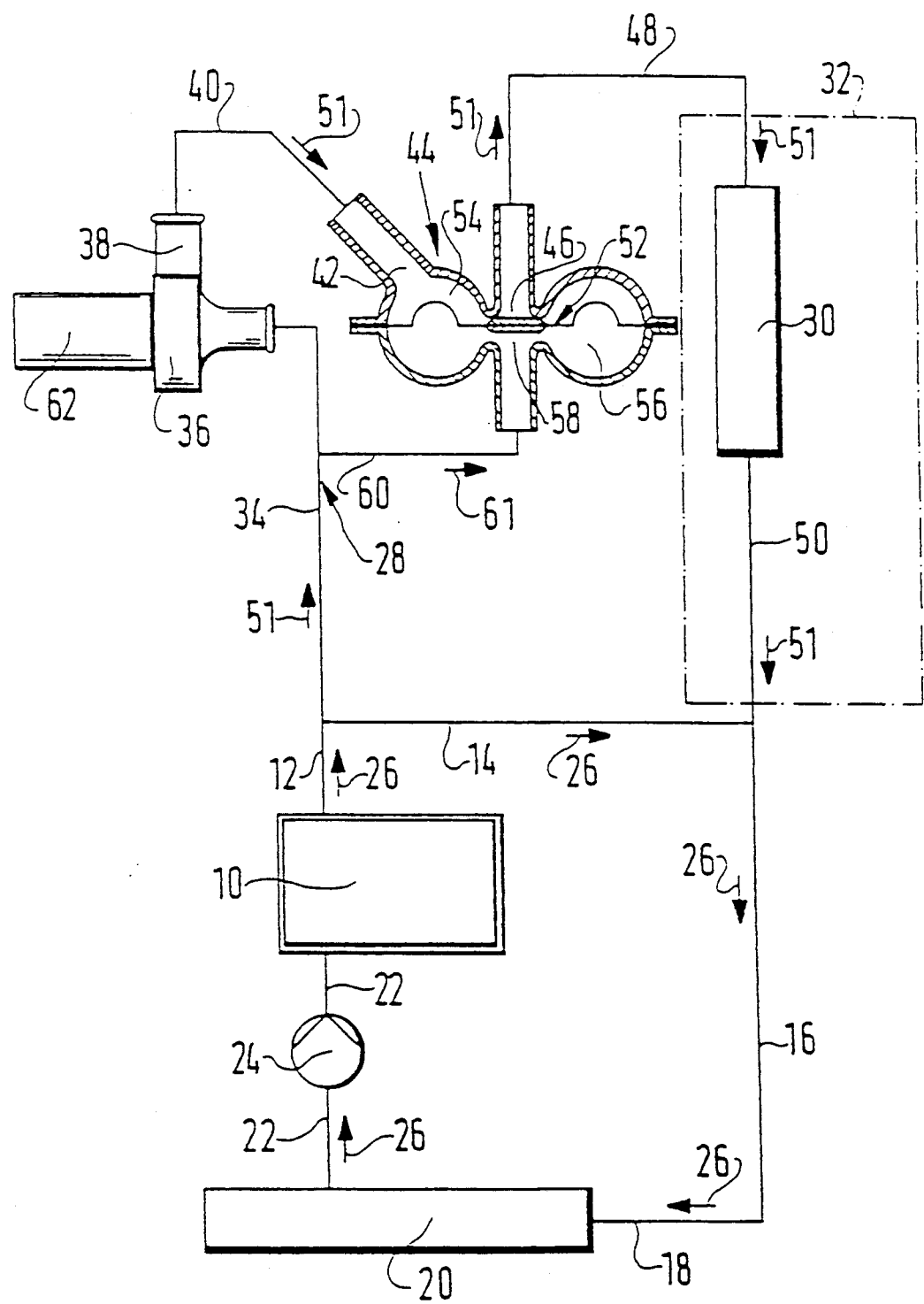

HEATING SYSTEM FOR THE PASSENGER COMPARTMENT OF A MOTOR VEHICLE HAVING A LIQUID-COOLED INTERNAL COMBUSTION ENGINE

BACKGROUND OF THE INVENTION

The invention relates to a heating system including a cooling circuit with a delivery unit for circulating the cooling liquid, and a heating loop connected to the cooling circuit and having a heat exchanger arranged in the passenger compartment of a motor vehicle. The feeding line of the heat exchanger is connected to the cooling circuit at a point downstream of the vehicle engine in the direction of flow of the liquid. The return line of the heat exchanger is connected to the delivery unit of the cooling circuit. A heating system is already commercially available in which, in addition to the delivery unit maintaining the cooling circulation, there is arranged in the heating loop a heating pump which, when required, when the heating system is activated, ensures the proper flow of the cooling water heated by the internal combustion engine through the heat exchanger. However, when there is no longer a need for heat, a solenoid valve arranged between the heating pump and the heat exchanger blocks the supply of heat to the heat exchanger. In this operating condition of the heating system, the heating pump operates against the closed valve, this leading to increased operating noises which, amplified by the vehicle body, acting as a sound board, can be a considerable disturbance. Furthermore, the construction of the known heating system as regards the solenoid valve is very complicated and operation is not very economical in view of the fact that the heating pump, operating against the closed valve, runs constantly when the automatic heating system is switched on.

SUMMARY OF THE INVENTION

The object of the invention is a heating system in which the expensive solenoid valve can be omitted. The object of the invention is achieved by providing in the shut-off device of the heating loop, a chamber-like expansion divided by a movable wall in two sub-chambers. One of the sub-chambers has inlet and outlet ports, and the other chamber has a pressure port. The operating noises of the delivery unit are decisively reduced because, when the shut-off device is closed, the unit acts against both sides of the moveable wall, the oscillations emanating from the delivery unit thereby cancelling each other out, with the result that the troublesome noise generation is at least greatly reduced.

The present invention both as to its construction so to its mode of operation, together with additional objects and advantages thereof, will be best understood from the following detailed description of the preferred embodiment when read with reference to the accompanying drawings.

BRIEF DESCRIPTION OF THE DRAWING

The single drawing FIGURE shows a schematic view of the heating system, according to the invention with a shut-off device shown schematically in section.

DESCRIPTION OF THE PREFERRED EMBODIMENT

A heating system illustrated in the drawing is associated with an internal combustion engine 10, of a motor vehicle (not illustrated further) and is cooled in operation via a cooling-water circuit. From the internal combustion engine, the cooling water flows via conduit sections 12, 14, 16, 18 into an air-cooled radiator 20, known per se, and from the latter, via a further conduit 22 to a delivery unit 24 which, driven by the internal combustion engine, circulates the cooling water in the cooling circuit. The cooling water thus flows in the direction of the arrows 26 through the cooling circuit 10, 12, 14, 16, 18, 20, 24. Connected to the cooling circuit is a heating circuit 28, in which there is a heat exchanger 30, which is installed in the passenger compartment 32 of the motor vehicle. The heating circuit 28 is formed by a loop-like extension of the coolant circuit. In relation to the heat exchanger 30, a feed line 34, 40, 48 of the heating loop 28 is connected to the cooling circuit at a point downstream of the internal combustion engine 10, in the direction of flow 26 in the cooling circuit. This feeding line opens into the intake side of a flow pump 36, to the delivery branch 38 of which is connected a part 40 of the feeding section of the heating loop 28. The part 40 is connected via an inlet port 42 to a shut-off device 44, which forms a chamber-like expansion of the feeding line 34, 40, 48. The shut-off device 44 furthermore has an outlet port 46, which is connected to the heat exchanger 30 via the further conduit 48. A return conduit 50 leads back from the heat exchanger 30 to the heating circuit 12, 14, 16, 18, 20, 22, 24. As seen in the direction of flow 26 of the cooling circuit, the return conduit 50 here opens into the cooling circuit upstream of the radiator 20. The shut-off device 44, which, in the illustrative embodiment is designed as a separate element, comprises a chamber which is divided into two subchambers 54 and 56 by a diaphragm 52. The diaphragm 52 forms a moveable wall, the edge of which is connected firmly and in leakproof fashion to the casing-like wall of the shut-off device 44. The diaphragm 52 is here arranged in such a way that both the inlet port 42 and the outlet port 46 are located in the one subchamber 54. The other subchamber 56 has a pressure port 58, which is connected to part 34 of the feeding conduit of the heating loop 28 via bypass 60. The design and arrangement of the diaphragm 52 is such that, in the rest position, shown in the drawing, it closes the outlet port 46. The flow pump 36, is driven by a variable-speed electric drive motor 62.

If, during the running of the motor vehicle, the heating system for the passenger compartment 32 is not switched on, the pressure prevailing in the cooling circuit is also present in subsections 34, 36, 38 and 40 of the feeding line of the heating loop 28. It is clear that the pressure present in the section 34 of the feeding conduit is, generated by the delivery unit 24, propagates via the nonsealing flow pump 36 and its delivery branch 38 into feeding conduit section 40, with the result that this pressure also prevails in subchamber 54 of the shut-off device 44. However, via the bypass 60 and the pressure port 58 this pressure is also present in the other subchamber 56 of the shut-off device 44 (arrow 61). Since that face of the diaphragm 52 which faces subchamber 56 is larger by the cross-sectional area of the outlet port 46 than that face of the diaphragm 52 which faces subchamber 54, proper sealing of the one subchamber 54 with respect to the outflow port 46 is ensured. It is thus guaranteed that, while the heating system is switched off, no heat is fed to the heat exchanger 30. Furthermore, the arrangement of the shut-off device described has the advantage that the pressure oscillations emanating from the coolant delivery unit 24 are present simultaneously and on both sides of the diaphragm 54, with the result that these cancel each other out. Troublesome noises emanating from the coolant delivery unit 24 are thus reduced to a minimum.

If, however, a temperature sensor, accommodated in the passenger compartment 32 of an electronic control system (not shown) indicates that heat must be fed to the passenger compartment 32, the electric motor 62 and thus the flow pump 36 are first of all activated. The flow pump 36 thus increases the pressure in the section 40 of the feeding conduit and hence also in the one subchamber 54 of the shut-off device 44. The pressure rise in these subsections of the heating loop 28 is so great that the pressure prevailing in the other subchamber 56 of the shut-off device 44 is overcome, with the result that the diaphragm 52 lifts away from the outlet port 46 and comes to rest against the pressure port 58. Due to the freeing of the outlet port 46, part of the cooling fluid coming from the internal combustion engine 10 now flows via the feeding heating section 34, 36, 38, 40 into the subchamber 54 of the shut-off device 44 and leaves the latter via the outlet port 46, from where is passes via the further section 48 of the feeding line into the heat exchanger 30. From this, it is passed back into the cooling circuit 10 to 24 via the return conduit 50. This is shown clearly in the drawing by the arrows 51.

It is conceivable to arrange a plurality of heat exchangers 30 in the passenger compartment 32 of the motor vehicle, to each of which heat exchangers a complete heating loop 28 is then to be allocated. Furthermore, it is conceivable to actuate the shut-off device 44 pneumatically, electrically or mechanically. Of course, the shut-off device can also be arranged externally or integrated into the flow pump 36.

The arrangement of the electric motor-driven flow pump 36 in the heating loop 28 ensures proper flow of the heated cooling liquid of the heating loop 28 even when the coolant delivery unit 24 can no longer by itself ensure a proper supply to the heat exchanger 30, for example in the case of extreme cold and with the internal combustion engine 10 operating under low load. Of particular significance here is the fact that the electric motor 62 is of variable speed, with the result that a change in the volume flow of the heating medium can be achieved in a simple manner.

While the invention has been illustrated and described as embodied in a heating system for a motor vehicle with a liquid-cooled internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A heating system for a passenger compartment of a motor vehicle having a liquid-cooled internal combustion engine and a cooling circuit for cooling the same and including a delivery unit for circulating a cooling liquid, said heating system comprising a heat exchanger located in the passenger compartment; a feeding conduit extending between said heat exchanger and the cooling circuit and connected to the cooling circuit at a point downstream of the internal combustion engine in a direction of liquid flow; a return conduit extending between said heat exchanger and the delivery unit of the cooling circuit; and shut-off device for blocking flow of heat to said heat exchanger, said shut-off device including first and second chambers, inlet and outlet ports communicating with the first chamber, a pressure port communicating with the second chamber and connected with said feeding conduit, and a wall separating said first and second chambers and movable between a first position in which it blocks communication between the inlet port and outlet port, and a second position in which it closes said pressure port and provides for communication between said inlet and outlet ports.

2. A heating system according to claim 1, wherein said feeding conduits have three different sections, said inlet, outlet, and pressure port being connected with said three different sections, respectively.

3. A heating system as set forth in claim 1, wherein said shut-off device includes wall means defining said first and second chambers, said separating wall being formed by a disphragm connected to said wall means.

4. A heating system as set forth in claim 1, wherein said first position of said separating wall is a rest position thereof.

5. A heating system as set forth in claim 1, further comprising means for delivering a heating liquid to said inlet port, said separating wall being movable from said first position to said second position upon actuation of said delivering means.

6. A heating system as set forth in claim 5, wherein said delivering means comprises an on-off pump arranged in a section of said feeding conduit that is connected with said inlet port.

7. A heating system as set forth in claim 6, further comprising a variable-speed electric motor for driving said on-off pump.

8. A shut-off device for a motor vehicle heating system including a heat exchanger located in a motor vehicle passenger compartment and a feeding conduit for supplying heating medium to said heat exchanger, said shut-off device comprising first and second chambers; an inlet port to be connected with the feeding conduit and communicating with the first chamber; an outlet port communicating with said first chamber and to be connected with an inlet of the heat exchanger; a pressure port communicating with the second chamber and to be connected with the feeding conduit at a point upstream of a point where said inlet port is to be connected with the feeding conduit; and a wall separating said first and second chambers and movable between a first position in which it blocks communication between the inlet port and the outlet port, and a second position in which it closes said pressure port and provides for communication between said inlet and outlet ports.

* * * * *